United States Patent
Duale et al.

(10) Patent No.: US 8,479,172 B2
(45) Date of Patent: Jul. 2, 2013

(54) VIRTUAL MACHINE TESTING

(75) Inventors: Ali Y. Duale, Poughkeepsie, NY (US); Shailesh R. Gami, Poughkeepsie, NY (US); Dennis W. Wittig, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/952,281

(22) Filed: Nov. 23, 2010

(65) Prior Publication Data
US 2012/0131560 A1 May 24, 2012

(51) Int. Cl.
G06F 9/44 (2006.01)
(52) U.S. Cl.
USPC .......................................... 717/134; 717/124
(58) Field of Classification Search
USPC .......................................................... 717/134
See application file for complete search history.

(56) References Cited

U.S. PATENT DOCUMENTS

| | | | | |
|---|---|---|---|---|
| 6,253,224 B1 * | 6/2001 | Brice et al. | ........................ | 718/1 |
| 6,834,359 B2 * | 12/2004 | Boehm et al. | .................... | 714/28 |
| 7,685,593 B2 * | 3/2010 | Solomon et al. | .............. | 717/170 |
| 7,971,047 B1 * | 6/2011 | Vlaovic et al. | ..................... | 713/1 |
| 2005/0246453 A1 * | 11/2005 | Erlingsson et al. | ............... | 710/1 |
| 2006/0025985 A1 * | 2/2006 | Vinberg et al. | .................. | 703/22 |
| 2008/0040709 A1 * | 2/2008 | Blancha et al. | ............... | 717/130 |
| 2011/0161912 A1 * | 6/2011 | Eteminan et al. | ............. | 717/101 |
| 2011/0185231 A1 * | 7/2011 | Balestrieri et al. | .............. | 714/27 |
| 2011/0296384 A1 * | 12/2011 | Pasternak | ....................... | 717/124 |
| 2011/0307739 A1 * | 12/2011 | El Mahdy et al. | .............. | 714/28 |
| 2012/0054551 A1 * | 3/2012 | Gao et al. | ..................... | 714/38.1 |
| 2012/0084607 A1 * | 4/2012 | Lam et al. | .................... | 714/38.1 |

* cited by examiner

*Primary Examiner* — Don Wong
*Assistant Examiner* — Theodore Hebert
(74) *Attorney, Agent, or Firm* — Cantor Colburn LLP; Steven Chiu

(57) ABSTRACT

A system for testing a base machine includes the base machine that has a base feature set (BFS) and a testing module. The system also includes a test case generator, configured to: select a prior level of the base machine, the prior level having a legacy architecture; determine a feature set of the legacy architecture based on the BFS; generate a set of test instructions based on the feature set; and provide the set of test instructions to the testing module.

16 Claims, 2 Drawing Sheets

VIRTUAL MACHINE TESTING

BACKGROUND

The present invention relates to testing computing systems, and more specifically, to testing computing systems that support various levels of virtual architectures.

A systems complex, sometimes called a "Sysplex" or "mainframe" or "server" is one or more processors joined into a single unit, sharing the same Sysplex name and data sets. A Sysplex may also be referred to generally herein as a computing system. Sysplexes can be broken down into logical partitions (LPARs) each running its own operating system.

Some computing systems include provisions that allow them to behave in the same manner as previous versions of the computing system. Such an ability allows an end-user of the computing system to utilize a legacy architecture in one or more partitions while newer features can be used in other partitions. Accordingly, in any given computing system that supports LPAR's, several different architecture levels may be operated simultaneously.

Within the same LPAR, it is possible to define multiple virtual architecture levels that include current and legacy architectures. Depending on certain settings, the current partition can appear as a legacy machine (i.e., can behave as n-m level; where n is current machine level and m is a digit showing the number of backward levels) or remain as a current base machine.

Virtual architectures allow end users the liberty to use legacy architecture in some partitions while newer features can be used in other partitions.

Dynamic configuration that allows testing different levels of the basic machine is challenging. It requires, in the worst case, manual interaction to modify machine features to the target architecture to be tested.

SUMMARY

According to one embodiment of the present invention, a system for testing a base machine is disclosed. The system of this embodiment includes the base machine and the base machine includes a base feature set (BFS) and a testing module. The system of this embodiment also includes a test case generator configured to: select a prior level of the base machine, the prior level having a legacy architecture; determine a feature set of the legacy architecture based on the BFS; generate a set of test instructions based on the feature set; and provide the set of test instructions to the testing module.

According to another embodiment of the present invention, a method of testing a base machine, the base machine including a base feature set (BFS) and a testing module is disclosed. The method of this embodiment includes generating test instructions with a test case generator wherein generating includes: selecting a prior level of the base machine, the prior level having a legacy architecture; determining a feature set of the legacy architecture based on the BFS; and generating a set of test instructions based on the feature set. The method of this embodiment also includes providing the set of test instructions to the testing module.

According to another embodiment of the present invention a computer program product for testing a base machine, the base machine including a base feature set (BFS) and a testing module, is disclosed. The he computer program product of this embodiment includes a computer readable storage medium having computer readable program code embodied therewith, the computer readable program code comprising instructions that cause the computing device to perform a step of generating test instructions, generating including: selecting a prior level of the base machine, the prior level having a legacy architecture; determining a feature set of the legacy architecture based on the BFS; and generating a set of test instructions based on the feature set. The computer readable program code further comprises instructions that cause the computing device to perform a step of providing the set of test instructions to the testing module.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to systems, methods and computer program products that allow for mimicking different virtual architectures on a base computer to ensure that it can support all legacy architectures of the machine. In such embodiments, the different virtual architectures can be utilized to test the base computing system (base machine) in both pseudo-random testing and emulation.

According to one embodiment, a feature set for each legacy architecture is created dynamically. With these sets of features, a test case generator can dynamically configure the base machine based on the randomly selected legacy architecture.

Figure 1:
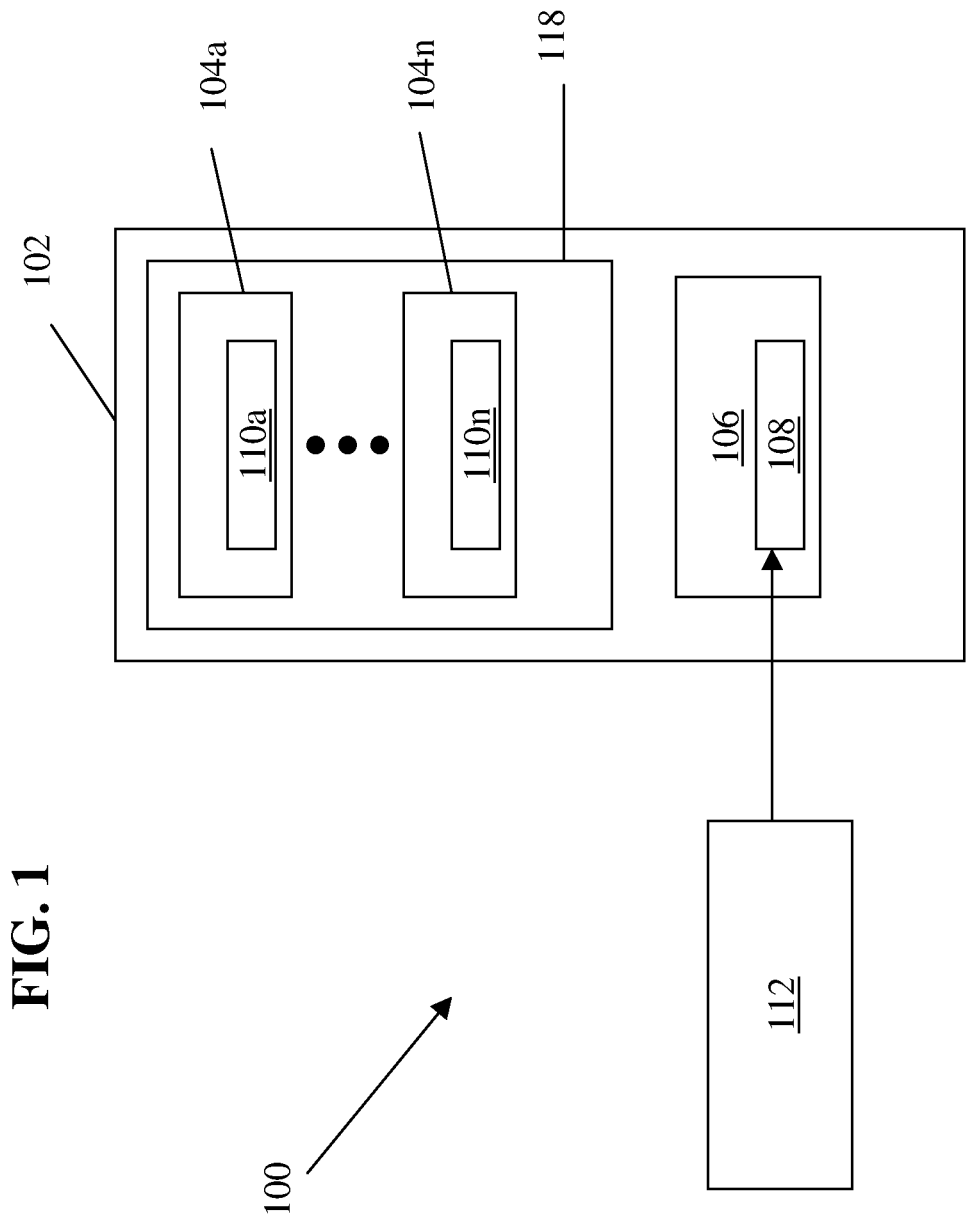
FIG. 1 illustrates and example of the system according to one embodiment of the present invention.

FIG. 1 illustrates a computing system 100 according to one embodiment. The computing system 100 includes a base machine 102. In one embodiment, the base machine 102 is a mainframe, server, or any other type of computing device. The base machine 102 includes a feature set that is referred to herein as the base feature set (BFS) and includes all valid features of the base machine 102. It shall be understood, that each revision of the base machine 102 shall be referred to herein as "level." As such, the base machine may have a base level assigned to it. Prior versions of the base machine 102 have different levels assigned to them. Each of these prior versions have an architecture that is referred to generally herein as a "legacy architecture." Each legacy architecture includes its own feature set. As one of ordinary skill in the art will realize, from one level to the next, certain features may be added, removed, or remain constant.

The computing system 100 can be divided into logical partitions (LPARs) 104a . . . 104n that support multiple operating systems (OSs) 110a to 110n. The LPARs 104a . . . 104n can function as separate virtual servers on the base machine 102. The LPARs 104a . . . 104n can be implemented in main storage 118, where main storage 118 is computer memory for the base machine 102. In one embodiment, each LPAR can be configured to operate on the base architecture or any legacy architecture. Accordingly, the base machine 102 may need to be tested to ensure that it operates correctly for the base architecture and one or more of the legacy architectures. In one embodiment, the base machine 102 is tested to ensure that it operates correctly for all of the legacy architectures.

The base machine 102 also includes testing module 106. The testing module 106 receives a set of test instructions 108. In one embodiment, the testing module can provide the test instructions 108 to a command line of the base machine 102. Based on the test instructions 108, the testing module 106 configures the base machine 102 to either the base architecture or a legacy architecture. The architecture to be tested shall be referred to herein as the "target architecture" and is selected, in one embodiment, from the base architecture or one of the legacy architectures. Of course, in one embodiment, a user may modify the test architecture such that it is different than the base architecture or one of the legacy architectures.

In one embodiment, the test instruction 108 includes a definition of the set of all valid features for the target architecture. The test instructions 108 can also include one or more specific test instructions for the testing module 106 to implement on the base machine 102. Of course, in one embodiment, the test instructions 108 do not include all or some of the set of valid features. As such, in one embodiment, the test instructions 108 only include the one or more specific test instructions. It shall be understood that the test instructions 108 may be stored as data, software, hardware, or a combination thereof.

The computing system 100 illustrated in FIG. 1 also includes a test case generator 112. As illustrated, the test case generator 112 is outside the base machine 102. Of course, the test case generator 112 could be included in or otherwise coupled to the base machine 102. In one embodiment, the test case generator 112 generates the test exerciser element 108. In one embodiment, the test case generator 112 is configured to select one of the target architectures and provides one or more test instructions and an identification of the test architecture to the testing module 106 as the test instructions 108. Of course, the identification of the test architecture could simply include one or more instructions that configure the base machine 102 to the test architecture.

In one embodiment, the test case generator 112 creates the set of features to configure the target architecture. This may be done utilizing five sets of feature sets. In particular, these sets are referred to herein as:

BFS=Base Feature Set: Set of all valid features for the base machine 102;

NFS=New Feature Set: Set of all new features for each machine level as compared to a previous level;

GFS=Global Feature Set: Set of all features that are valid for all machine levels;

RFS=Removed Feature Set: Set of all features that were removed between one level and the next, higher level (assuming that later levels are given higher identifiers); and VFS=Valid Feature Set: Set of all valid features for any given machine level.

In one embodiment, the five sets are stored in the test generator 112. Upon introduction of a next level, these sets can be updated in a manner that will be understood by one of skill in the art.

As will be understood, the VFS is used as the basis for configuring the base machine 102 into the target architecture level. In one embodiment, the VFS is determined from one or more of the other four sets of features.

In more detail, initially, the BFS is defined. For each machine level, all new function information is set in NFS. Note that embodiments of the present invention contemplate that new features can be defined to be valid for all previous levels. Therefore, the GFS is always added to the VFS in one embodiment. In one embodiment, VFS is calculated by the test case generator 112 according to the following relationship:

$$VFS(i) = BFS - \Sigma_{(k=0\ k=i-1)} NFS(k) + \Sigma_{(k=0\ k=i-1)} RFS(k) + GFS;$$

where i is the number of machine levels back from the base machine 102 required to reach the target architecture and k is the level of the target architecture.

From the above relationship, the set of all valid features for a given machine level i ($VFS_i$) is computed based on the base machine feature set (BFS). All features introduced between the target machine level and the base machine (NFS) are subtracted from the BFS. Any feature that is removed from all levels between the base level and the target level (RFS) are added to the valid feature set for the target set. Finally, all features that are in the base architecture defined to be valid for all previous levels (GFS) are added to the valid feature set for the target architecture.

Figure 2:
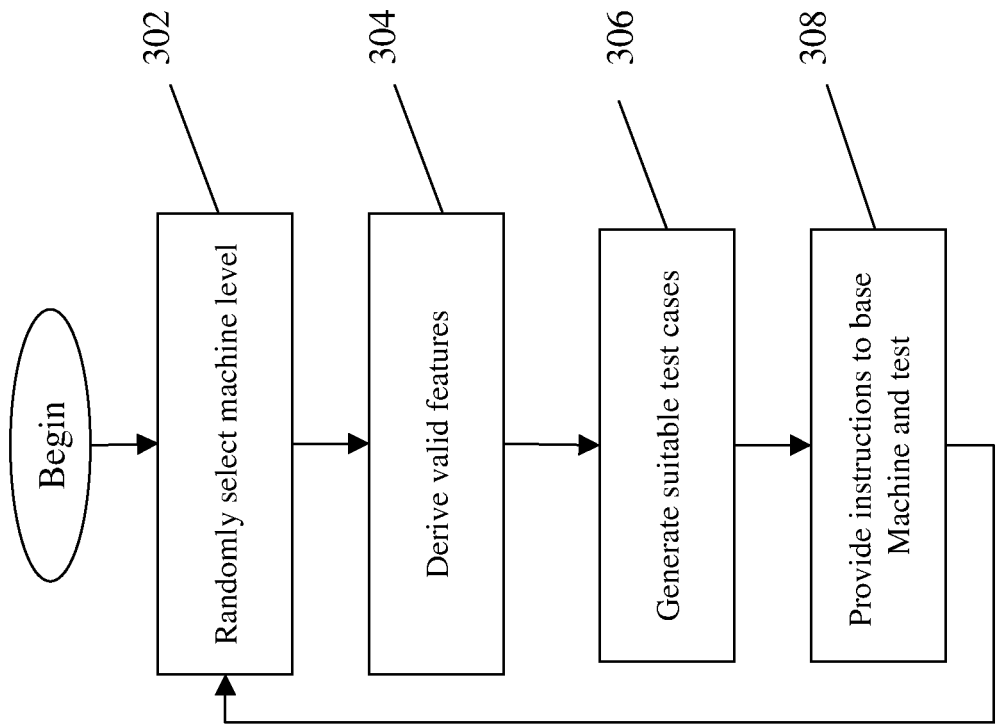
FIG. 2 is a flow chart detailing a method according to one embodiment of the present invention.

FIG. 2 illustrates a method according to one embodiment of the present invention. In one embodiment, the method may be performed, for example, by the test case generator 112 in order to create the test instructions 108. In more detail, at block 302 a target architecture (i.e., machine level) is selected. In one embodiment, the selection is random or pseudo-random. At block 304, a valid feature set for the target architecture is generated. In one embodiment, the valid feature set (VFS) is generated as describe above. At block 306 the valid feature set is utilized to generate suitable test cases. That is, a series of test instructions are generated to test only valid features of the target architecture. In one embodiment, the test instructions form the test instructions 108 described above. Of course, the method shown in FIG. 2 may include means of causing the steps thereof to repeat (as illustrated) and/or to halt the method. At block 308, the test case is provided to the base machine and they are performed in order to test the base machine.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of methods disclosed herein or to cause a computing device to perform the methods disclosed herein. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include providing different legacy architectures to a base computing system to test that the base machine can operate in any of the legacy architectures.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A system for testing a base machine, the system comprising:
   the base machine, the base machine including a base feature set (BFS) and a testing module; and
   a test case generator, the test case generator being configured to:
   select a testing level of the base machine, the testing level having a legacy architecture;
   determine a feature set of the legacy architecture based on the BFS;
   generate a set of test instructions based on the feature set; and
   provide the set of test instructions to the testing module;
   wherein the test case generator includes at least the following feature sets:
   the BFS, the BFS including the valid features for the base machine;
   a new feature set (NFS) for each level that includes all new features for each machine level as compared to an immediately prior level;
   a global feature set (GFS) of all features that are valid for all machine levels; and
   a removed feature set (RFS) for each level that includes all features that were removed from an immediately prior level.

2. The system of claim 1, wherein the base machine is a computing system that can be configured into logical partitions (LPARs).

3. The system of claim 1, wherein the test case generator is within the base machine.

4. The system of claim 1, wherein the testing module causes the base machine to execute the set of test instructions.

5. The system of claim 1, wherein the set of test instructions includes instructions that, when performed by the base machine, cause the base machine to be configured into the legacy architecture.

6. The system of claim 1, wherein the testing level is selected randomly.

7. The system of claim 1, wherein the feature set for the legacy architecture (VFS) is determined by the following relationship:

$$VFS(i)=BFS-\Sigma_{(k=0\ k=i-1)}NFS(k)+\Sigma_{(k=0\ k=i-1)}RFS(k)+GFS;$$

where i is the difference in levels between the base machine and the legacy architecture.

8. A method of testing a base machine, the base machine including a base feature set (BFS) and a testing module, the method comprising:
   generating test instructions with a test case generator, generating including:
   selecting a prior level of the base machine, the testing level having a legacy architecture;
   determining a feature set of the legacy architecture based on the BFS; and
   generating a set of test instructions based on the feature set; and
   providing the set of test instructions to the testing module:
   wherein the test case generator includes at least the following feature sets:
   the BFS, the BFS including the valid features for the base machine;
   a new feature set (NFS) for each level that includes all new features for each machine level as compared to an immediately prior level;
   a global feature set (GFS) of all features that are valid for all machine levels; and
   a removed feature set (RFS) for each level that includes all features that were removed from an immediately prior level.

9. The method of claim 8, further comprising:
   executing the set of test instructions on the base machine.

10. The method of claim 8, wherein the set of instructions includes instructions that, when performed by the base machine, cause the base machine to be configured into the legacy architecture.

11. The method of claim 8, wherein the testing level is selected randomly.

12. The method of claim 8, wherein the feature set for the legacy architecture (VFS) is determined by the following relationship:

$$VFS(i)=BFS-\Sigma_{(k=0\ k=i-1)}NFS(k)+\Sigma_{(k=0\ k=i-1)}RFS(k)+GFS;$$

where i is the difference in levels between the base machine and the legacy architecture.

13. A computer program product for testing a base machine, the base machine including a base feature set (BFS) and a testing module, the computer program product comprising:
   a computer readable storage medium having computer readable program code embodied therewith, the computer readable program code comprising instructions that cause the computing device to perform the steps of:
   generating test instructions with a test case generator, generating including:
   selecting a prior level of the base machine, the testing level having a legacy architecture;
   determining a feature set of the legacy architecture based on the BFS; and
   generating a set of test instructions based on the feature set; and
   providing the set of test instructions to the testing module:
   wherein the test case generator includes at least the following feature sets:
   the BFS, the BFS including the valid features for the base machine;
   a new feature set (NFS) for each level that includes all new features for each machine level as compared to an immediately prior level;
   a global feature set (GFS) of all features that are valid for all machine levels; and
   a removed feature set (RFS) for each level that includes all features that were removed from an immediately prior level.

14. The computer program product of claim 13, wherein the set of instructions includes instructions that, when performed by the base machine, cause the base machine to be configured into the legacy architecture.

15. The computer program product of claim 13, wherein the testing level is selected randomly.

16. The computer program product of claim 13, wherein the feature set for the legacy architecture (VFS) is determined by the following relationship:

$$VFS(i)=BFS-\Sigma_{(k=0\ k=i-1)}NFS(k)+\Sigma_{(k=0\ k=i-1)}RFS(k)+GFS;$$

where i is the difference in levels between the base machine and the legacy architecture.

* * * * *